United States Patent [19]
Bradshaw, Jr.

[11] Patent Number: 4,776,266
[45] Date of Patent: Oct. 11, 1988

[54] APPARATUS FOR PRODUCING CHEESE STRAWS

[76] Inventor: Martin H. Bradshaw, Jr., 5 Horseleg Creek Rd., Rome, Ga. 30161

[21] Appl. No.: 922,246

[22] Filed: Oct. 23, 1986

[51] Int. Cl.⁴ ............................................. A47J 37/12
[52] U.S. Cl. ........................................ 99/353; 99/403
[58] Field of Search ................ 99/353, 403, 279, 330, 99/336, 345, 352, 355, 359, 427

[56] References Cited

U.S. PATENT DOCUMENTS

| | | | |
|---|---|---|---|
| 3,106,151 | 10/1963 | Porambo | 99/353 |
| 3,255,715 | 6/1966 | Urschel | 99/353 X |
| 3,450,068 | 6/1969 | Temple | 99/353 |
| 4,096,791 | 6/1978 | Weiss et al. | 99/353 |
| 4,343,603 | 8/1982 | Pavlow et al. | 99/353 X |
| 4,535,687 | 8/1985 | Antpöhler | 99/353 X |

Primary Examiner—Louis K. Rimrodt
Assistant Examiner—J. L. Olds
Attorney, Agent, or Firm—Hurt, Richardson, Garner, Todd & Cadenhead

[57] ABSTRACT

An apparatus and process for producing cheese straws and the like is disclosed, the apparatus including a mixing and extruding device from which the mixed dough is forced through a die having a plurality of outlets. The dough is received on a conveyor where it is cut into segments and baked. The process involves mixing flour, cheese, margarine and seasonings in specific proportions, the apparatus and process being capable of producing approximately eighteen hundred dozen cheese straws per hour.

9 Claims, No Drawings

APPARATUS FOR PRODUCING CHEESE STRAWS

BACKGROUND OF THE INVENTION

Cheese straws are an edible product made from a mixture of cheese, flour, margarine and other ingredients, the mixture forming a dough. The dough may be rolled into an elongated shape by hand, or placed in a hand-held dough extruder such as a cookie gun, cut or squeezed out to a length of approximately two to three inches or to a star or other shape and then baked. The final product is a cookie-like snack which is then bagged or boxed for sale.

Presently, the process of making cheese straws is very time consuming. The relatively thick consistency of the dough has not previously lent the process to any form of automated production. In addition, for proper baking, the cheese dough should be relatively flattened for even and thorough baking.

While automated production techniques have been employed for making meat products, as evidenced by U.S. Pat. No. 2,572,833 to Balzarini for an Apparatus for Making Edible Products and U.S. Pat. No. 4,148,598 to Colosimo et al. for an Extrusion Die for Sausage and the Like, the product being produced lends itself to the apparatus and methods. These patents involve sausage making devices, the meat being ground to an almost liquid-like consistency before being channeled into casings.

Thus, for years, cheese straw production has been limited to a few dozen per hour due to the necessity of limited batch production, rolling and cutting, and/or squeezing the dough through a cookie gun by hand, to form the product to a shape which can be successfully baked. This has made the production and sale of the cheese straws prohibitive on a commercial basis, production normally being done only in the home by individuals making snacks or the like or on a limited scale by a bakery.

SUMMARY OF THE INVENTION

It is, therefore, one of the principal objects of the present invention to provide an apparatus and process for producing cheese straws having an automated production technique for greatly increasing output of the product.

Another object of the invention is to produce a uniform product which can be easily and successfully baked due to the configuration of the extrusion die, and which apparatus is unaffected by the product and easily cleaned.

A further object of the present invention is to provide an inexpensive and efficient production method and apparatus which is durable for providing a long service life.

These and additional objects are attained by the present invention which relates to an apparatus and process for producing cheese straws and like products having a mixing device which produces the dough mixture from the dry ingredients, and an extrusion device particularly suited for forming a generally flat elongated dough product. The dough thus formed is conveniently cut to length and baked to form the final product.

A particular utility is found with the present apparatus and method in that while previously, the cheese straws have been made by individuals at a rate of a few dozen per hour, the present invention is capable of producing approximately eighteen hundred dozen per hour. Such a capability was heretofore not even considered, since the peculiar characteristics of the dough, that is, the relatively thick consistency and the need to bake the dough while relatively flat, did not appear susceptible to mass production.

Various additional objects and advantages will become apparent from the following description with reference to the accompanying drawings.

BRIEF DESCRIPTON OF THE DRAWINGS

DETAILED DESCRIPTION OF THE PREFERRED EMBODIMENT

Figure 1:
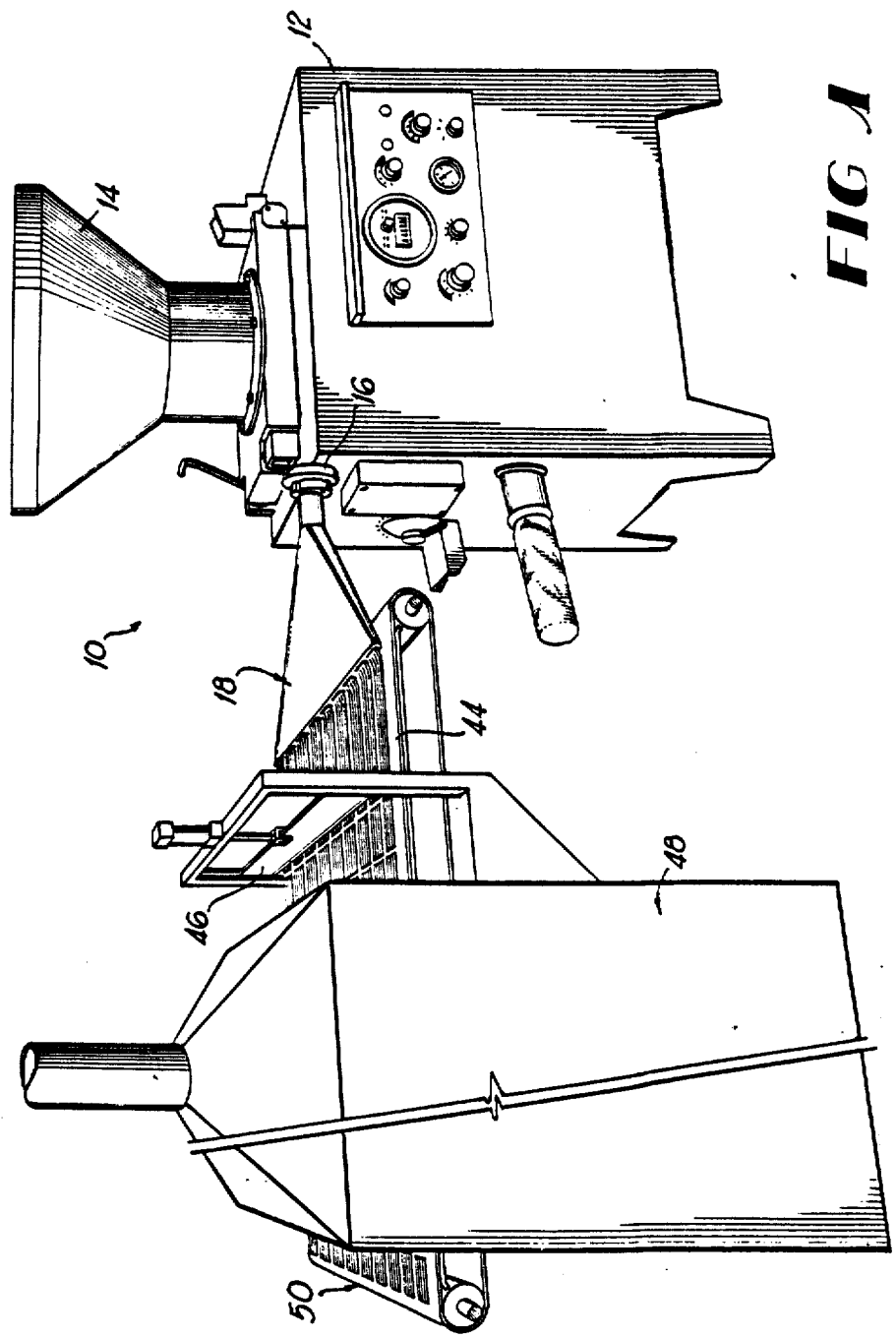
FIG. 1 is a perspective view of the apparatus for producing cheese straws, shown in the process of full production, the baking oven also being shown.

Referring now more specifically to the drawings and to FIG. 1 in particular, numeral 10 designates generally the Apparatus for Producing Cheese Straws. The apparatus is particularly suited for the production of cheese straws, which are cookie-like snacks that may be served at parties as appetizers and in similar situations. The following description will focus on the production of cheese straws using the present apparatus and method, however, similar food types may also be produced.

The cheese straws of the present invention are normally produced according to the following formula or recipe: three (3) cups of flour, one-half ($\frac{1}{2}$) lb. margarine, one (1) lb. cheddar cheese, a preferred cheese being New York extra sharp Cheddar, two (2) teaspoons salt, and three-fourths ($\frac{3}{4}$) teaspoon cayenne (red) pepper. The flour, salt and pepper are mixed together, and then the margarine and the previously grated cheese are added. This produces approximately twenty (20) dozen cheese straws, approximately two and one-half ($2\frac{1}{2}$) inches long by one (1) inch wide. The present apparatus and method will produce approximately eighteen hundred (1,800) dozen cheese straws per hour, thus the foregoing formula would be multiplied approximately ninety (90) times per hour of production. The quantity of dough produced is limited only by the capacity of the mixing container. This represents a preferred embodiment and is in no way meant to exclude variations, especially in the seasonings used.

As shown in FIG. 1, the above listed formula or a variation thereof is placed into a mixing device 12. The device has a hopper 14 into which the ingredients may be fed. The mixing device itself is conventional, and several suitable types are currently on the market. The device shown mixes the product and forces the product out through an upper outlet 16. The outlet has a threaded connection (not shown) to which an extrusion die means 18 is connected.

Figure 3:
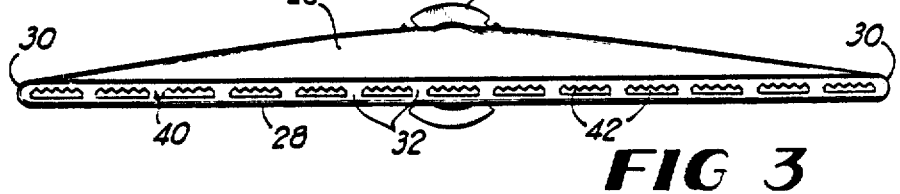
FIG. 3 is an end elevational view of the outlet of the extrusion die.

The extrusion die 18 has a threaded collar means 20 which is connected to the threaded outlet 16 of the mixing device. Extending outwardly from the collar means is a generally cylindrical feed tube 22 which merges into a flared body portion 24. The body portion 24 is symmetrical and includes generally flat upper and lower plates 26 and 28 respectively. The upper and lower plates are connected to one another by generally convex end portions 30. The outlet of the extrusion die is a generally flat plate member 40 which has a plurality of irregular or serrated crowned outlet means 42 or separate ports formed therein, there being wall portions 32 therebetween. As shown by FIG. 3, the end plate 40 serves to connect the side portions 30 with the upper and lower plates. The number of outlets 42 may vary, the embodiment shown having 13.

Figure 2:
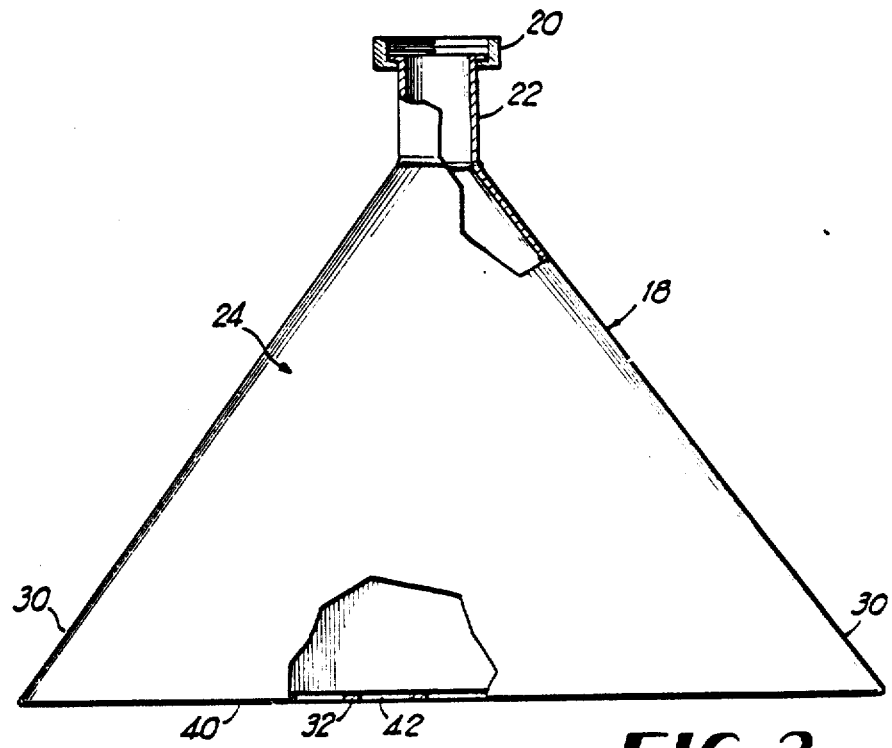
FIG. 2 is a top plan view of the extrusion die used with the present apparatus and process, with portions being broken away to show the interior thereof.
Figure 4:
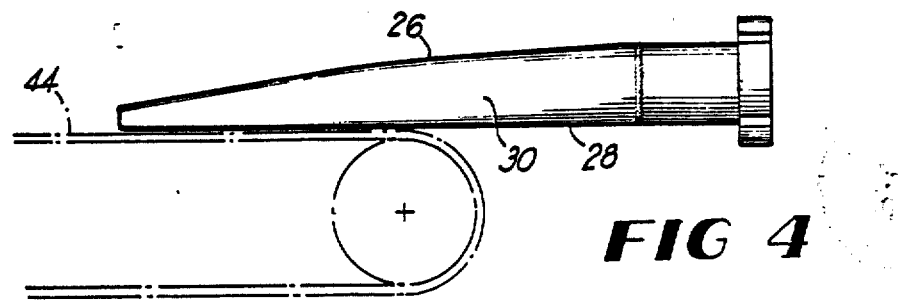
FIG. 4 is a side elevational view of the die shown in the preceding figure, with a conveyor belt and roller shown in broken lines and in position to receive the output from the die.

FIGS. 2, 3 and 4 illustrate the convergence and divergence of the extrusion die 18. Thus, from the feed tube 22, the upper and lower plates are generally triangular in shape and diverge outwardly from the feed tube 22. At the same time, the upper and lower plates converge toward one another as can be easily seen by FIG. 4, in order to produce a relatively thin dough product. The convergence is further pronounced by the ports or outlets 42, which are only approximately one-half of the height of plate member 40. The outlets as shown are flat on their bottom surface, so as to be conveniently received on a conveyor belt 44. The upper surface of the outlets 42 has a serrated configuration, which configuration is manifested in the extruded dough, this configuration facilitating the even baking of the dough extruded therefrom. The design of the extrusion die also facilitates extrusion of material therefrom, in that there are no areas within the die which would impede the progress of the dough therethrough. Thus, the convex side portions and the flattened inner surface of the upper and lower plate members cannot impede the flow of material therethrough.

The extruded dough emerges from the extrusion die at a level slightly above that of the conveyor belt 44, so as to not hinder the movement of the belt as it receives the extruded dough. The extruded dough then passes underneath a knife means, such as blade 46, which is selectively operable to cut the extruded dough into any desired length. After cutting, the dough passes through a suitable baking oven 48 where the product 50 is cooked and emerges therefrom ready for packaging and sale.

The process of the present invention involves first procuring a relatively large quantity of the formula ingredients, that is, the flour, grated cheese, seasonings, etc. and measuring these ingredients for introduction into the hopper 14 of the mixing device 12. Upon thorough mixing, the dough is extruded through the extrusion die 18, the die producing the dough in relatively thin, elongated ribbons. The ribbons are extruded onto a conveyor belt and passed beneath a blade which is selectively operated to slice the ribbons of dough into segments of approximately two to three inches in length. The individual segments, still on the conveyor belt, are then passed through an oven and after baking, the finished product is ready to be bagged or boxed for sale.

While an embodiment of an Apparatus and Process for Producing Cheese Straws has been shown and described in detail herein, various changes and modifications may be made without departing from the scope of the present invention.

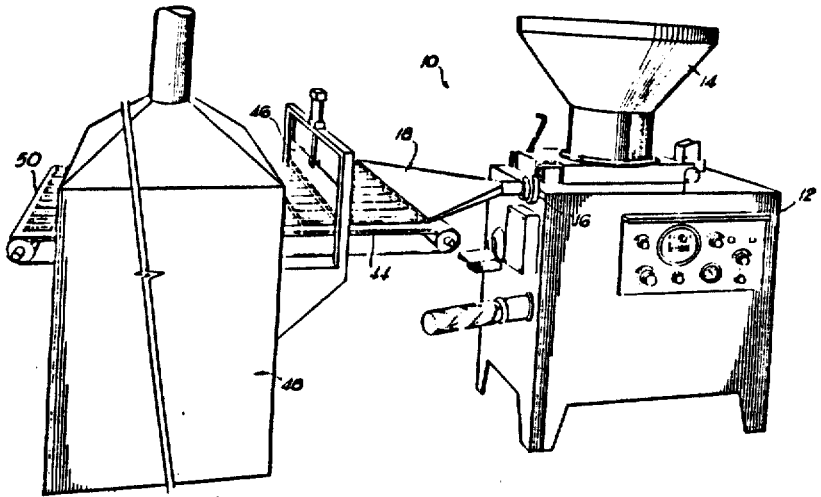

I claim:

1. An apparatus for producing cheese straws and the like comprising in combination, a mixing and extruding device for receiving and blending a plurality of ingredients, and having an inlet and an outlet, a die means having an inlet means secured to said outlet for receiving the blended dough extruded from said mixing device, said die means also including generally flat upper and lower plate members and side portions joining said plate members on each side thereof, said plate members diverging laterally outwardly from said inlet means of said die means and converging toward one another as the distance from said inlet increases for compressing the dough, a plurality of outlet means for said die means through which the dough is extruded, a conveyor means to receive the dough, an an oven for baking the dough to a finished product.

2. An apparatus as defined in claim 1 in which a knife means is provided over said conveyor and has means for selectively activating said knife means for slicing the extruded dough into segments.

3. An apparatus as defined in claim 1 in which said plurality of outlet means have a generally flattened lower edge and a generally serrated upper edge for producing a plurality of elongated, serrated ribbons of dough.

4. An apparatus as defined in claim 3 in which a knife means is provided over said conveyor and has means for selectively activating said knife means for slicing the extruded dough into segments.

5. An apparatus as defined in claim 4 in which said ingredients include cheese, flour, margarine, salt and pepper.

6. An apparatus as defined in claim 1 in which said side portions are generally convex for facilitating the flow of material therethrough.

7. In an apparatus for producing cheese straws and the like, in combination, a mixing device for receiving and blending a plurality of ingredients and extruding the mixed ingredients through an outlet, a conveyor for receiving the dough output from the mixing device and transporting the product through an oven for baking the dough wherein the improvement comprises an extrusion die means with an inlet means secured to the outlet of said mixing device for receiving the dough output, said die means having generally flat upper and lower plate means and generally convex end portions joining said upper and lower plate means on each side thereof, said plate members diverging laterally away from said inlet means in a horizontal plane and converging toward one another away from said inlet means in a vertical plane for compressing the dough therebetween, and an outlet means for said die means in the end opposite said inlet means, through which the dough is extruded on to said conveyor.

8. In an apparatus as defined in claim 7, said outlet means including a plurality of ports having generally flattened lower edges and irregular upper edges for producing substantially thin, elongated ribbons of dough with a serrated upper surface.

9. In an apparatus as defined in claim 8 and including a knife means disposed above said conveyor and selectively operable for slicing the elongated dough into segments.

* * * * *

UNITED STATES PATENT AND TRADEMARK OFFICE
CERTIFICATE OF CORRECTION

PATENT NO. : 4,776,266  Page 1 of 4

DATED : Oct. 11, 1988

INVENTOR(S) : Martin H. Bradshaw, Jr.

It is certified that error appears in the above-identified patent and that said Letters Patent is hereby corrected as shown below:

The Title Page should be deleted to appear as per attached Title Page.

"9 Claims, No Drawings" should read --9 Claims, 4 Figures--.

Figures 1-4 should be added as per attached sheets.

Signed and Sealed this

Tenth Day of January, 1989

Attest:

DONALD J. QUIGG

Attesting Officer

Commissioner of Patents and Trademarks

United States Patent [19]
Bradshaw, Jr.

[11] Patent Number: 4,776,266
[45] Date of Patent: Oct. 11, 1988

[54] APPARATUS FOR PRODUCING CHEESE STRAWS

[76] Inventor: Martin H. Bradshaw, Jr., 5 Horseleg Creek Rd., Rome, Ga. 30161

[21] Appl. No.: 922,246

[22] Filed: Oct. 23, 1986

[51] Int. Cl.⁴ ............................................. A47J 37/12
[52] U.S. Cl. ............................................. 99/353; 99/403
[58] Field of Search ............... 99/353, 403, 279, 330, 99/336, 345, 352, 355, 359, 427

[56] References Cited

U.S. PATENT DOCUMENTS

| | | | |
|---|---|---|---|
| 3,106,151 | 10/1963 | Porambo | 99/353 |
| 3,255,715 | 6/1966 | Urschel | 99/353 X |
| 3,450,068 | 6/1969 | Temple | 99/353 |
| 4,096,791 | 6/1978 | Weiss et al. | 99/353 |
| 4,343,603 | 8/1982 | Pavlow et al. | 99/353 X |
| 4,535,687 | 8/1985 | Antpöhler | 99/353 X |

Primary Examiner—Louis K. Rimrodt
Assistant Examiner—J. L. Olds
Attorney, Agent, or Firm—Hurt, Richardson, Garner, Todd & Cadenhead

[57] ABSTRACT

An apparatus and process for producing cheese straws and the like is disclosed, the apparatus including a mixing and extruding device from which the mixed dough is forced through a die having a plurality of outlets. The dough is received on a conveyor where it is cut into segments and baked. The process involves mixing flour, cheese, margarine and seasonings in specific proportions, the apparatus and process being capable of producing approximately eighteen hundred dozen cheese straws per hour.

9 Claims, No Drawings